Figure 1:
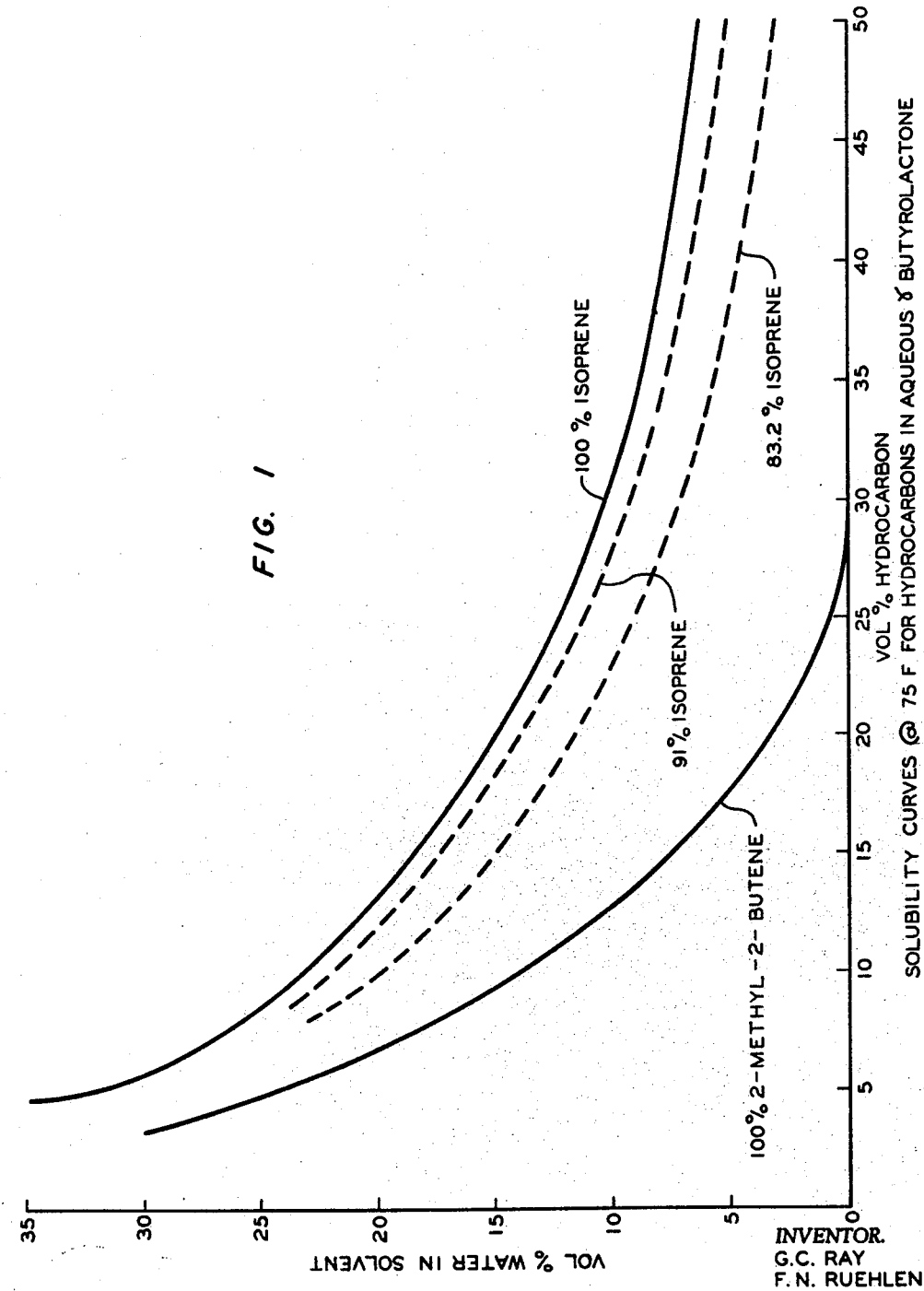

United States Patent Office 2,961,473
Patented Nov. 22, 1960

2,961,473

AQUEOUS LACTONES AS SELECTIVE SOLVENTS FOR DIOLEFINS

Gardner C. Ray and Forrest N. Ruehlen, Bartlesville, Okla., assignors to Phillips Petroleum Company, a corporation of Delaware Filed May 12, 1958, Ser. No. 734,692

12 Claims. (Cl. 260—681.5)

This invention relates to the separation of individual hydrocarbons from hydrocarbon mixtures. In one aspect, it relates to the separation of diolefins from olefins. In another aspect, it relates to the treatment of the effluent from the dehydrogenation of isopentane, comprising a mixture of isopentane, isopentenes, and isoprene, to recover isoprene.

In the processing of hydrocarbons it frequently becomes necessary to separate one or more compounds from a narrow boiling range mixture. In many cases, the desired separation while obtainable by conventional fractional distillations is not economically feasible and it becomes necessary to resort to other separation methods. Such a situation is presented in the dehydrogenation of isopentane wherein a reaction product is formed which contains a variety of $C_5$ olefins and diolefins as well as unreacted isopentane. Because of the small spread in the boiling points of the various compounds which make up the reaction product, good separation by fractional distillation requires an extremely large number of trays. Furthermore, to effect such a separation by fractional distillation would require prolonged heating of the reaction effluent, during which polymerization of the more unsaturated compounds can occur. Thus, fractional distillation alone, as a means for separating very narrow fractions from mixtures thereof, possesses a number of disadvantages.

It is an object of this invention to provide an improved process for separating individual hydrocarbons from hydrocarbon mixtures.

Another object of this invention is to provide an improved process for recovering diolefins from a hydrocarbon mixture containing diolefins and olefins.

Still another object of this invention is to provide an improved process for separating and recovering individual components from the reaction product of the dehydrogenation of isopentane.

Yet another object of the invention is to provide an improved process for recovering isoprene from a mixture containing $C_5$ olefins and isoprene.

These and other objects of the invention will become more readily apparent from the following detailed description and discussion.

The foregoing objects are achieved broadly by solvent extracting a hydrocarbon mixture containing olefins and diolefins with an aqueous solution of a lactone of an aliphatic acid and recovering the diolefins from said lactone.

It is known that diolefins can be separated from monoolefins in a solvent extraction process employing lactones, e.g., γ-butyrolactone, as the solvent. However, when using anhydrous or nearly anhydrous lactones, the solubility of the hydrocarbons is so great at ordinary room temperatures and more elevated temperatures that phase separation does not occur and it is impossible to resolve the hydrocarbon mixture into two phases. Thus, when operating with such a lactone, refrigeration is required. It is well known that refrigeration is undesirable, because it complicates the process and increases both capital investment and operating cost. It has now been found that by employing aqueous lactone, phase separation can be obtained at normal operating temperatures or higher. As discussed in more detail hereinafter, the minimum amount of water required depends on the temperature, the desired solvent loading, and the degree of product purity desired.

The method of this invention finds application generally in the separation of diolefins from olefins. More specifically, it finds application in the separation of low-boiling diolefins such as butadiene and isoprene from mixtures containing olefins having a corresponding number of carbon atoms. Hydrocarbon mixtures which can be treated for the separation and recovery of diolefins are encountered in various processing operations, for example, in processes for the preparation of butadiene and isoprene from more saturated hydrocarbons. Hydrocarbon mixtures formed in other reactions and also in various refining processes can also be treated in the method of this invention.

The following discussion is directed principally to the treatment of the reaction effluent from the dehydrogenation of isopentane, said effluent containing isoprene, unreacted isopentane and various $C_5$ olefins, for the purpose of recovering therefrom isoprene. It is not intended that this particular application be taken in a limiting sense, and it is within the scope of the invention to treat hydrocarbon mixtures in general as hereinbefore set forth.

In one method isoprene is prepared by the dehydrogenation of isopentane in the presence of a catalytic material. The reaction is usually carried out within a temperature range of between about 1,000 and about 1,300° F. and with a liquid hourly space velocity of between about 1 and about 10. The pressure employed can be subatmospheric or superatmospheric, however, extremes in pressure are not necessary to the reaction and it is preferred to carry the reaction out at about atmospheric pressure. The catalyst employed is preferably a high activity metal or metal oxide dehydrogenation catalyst, either alone or supported on a suitable carrier, such as alumina, magnesia, iron or iron oxide, promoted with an oxide of a metal of groups IV, V or VI of the periodic table. Specific examples of suitable catalysts are alumina-chromia, alumina-zirconia, alumina-titania, alumina-strontia, magnesia-molybdena, magnesia-vanadia, magnesia-chromia, and the like. In addition to the metal oxides set forth, other oxides of metals can also be employed, such as potassium, barium, zinc, cadmium, calcium, etc.

The effluent from the dehydrogenation reaction comprises a mixture of isopentane, isoprene, and various $C_5$ olefins, including 3-methylbutene-1, 2-methylbutene-1, and 2-methylbutene-2. In one aspect of the invention, this reaction product is contacted with an aqueous solution of a lactone of an aliphatic acid whereby separation and recovery of the isoprene is effected. As previously set forth, the separation is effected by solvent extraction. The basis for the recovery of isoprene from the reaction effluent by solvent extraction is the relative solubilities of the individual $C_5$ hydrocarbons in the lactone. This operation is carried out in a solvent extraction zone, with the isoprene, which is more soluble in the lactone than the other components of the effluent, being removed in admixture with the lactone as one stream and the remaining components passing from the solvent extraction zone as a separate stream. The process is usually carried out in a temperature range of between about 75° F. and about 150° F. and at a pressure of between about atmospheric and about 50 p.s.i.g. Preferably the separation is carried out at as low a temperature as possible without refrigeration, namely atmospheric temperature. As a practical matter, to allow for variations in temperature in different geographic localities the minimum year-round operating temperature which can be employed is about 75° F. Separation of the other components of the reaction effluent can also be accomplished by solvent extraction, utilizing either the lactone or another suitable solvent. The amount of aqueous lactone employed in separating the isoprene varies depending on the purity of product desired, the water content of the solvent, etc., and is usually between about 5 and about 20 volumes per volume of hydrocarbon feed. When the lactone is further employed for the separation of unreacted isopentane and the isopentenes, similar quantities of the lactone are used for this purpose. Recovery of the solvent for reuse, and the desired isoprene product, is effected by subjecting the solvent-isoprene extract to conventional stripping. While two-stage solvent extraction is perhaps preferred it is also possible to treat the reaction effluent in a combination process in which solvent extraction is utilized for the removal of isoprene and fractional distillation for the further separation of unreacted isopentane and isopentenes.

The lactones which are employed in carrying out the invention comprise in general lactones of aliphatic acids having 4 to 12 carbon atoms. Specific examples of lactones which can be used are gamma-butyrolactone, gamma-valerolactone, delta-valerolactone, caprolactone and homologues thereof. While any of the foregoing lactones can be used, gamma-butyrolactone is preferred.

The concentration of water in the aqueous solution of lactone can be varied to give the desired solvent loading. In order to operate with two liquid phases at atmospheric temperatures, namely at a minimum average temperature of about 75° F., as hereinbefore set forth, it is necessary that the solvent contain at least 5% water by volume. As the concentration of water is increased the solvent loading decreases, resulting in an improvement in separating efficiency of the aqueous solvent. However, the amount of solvent required to remove a given amount of solute will increase. Usually, for economic reasons, it is desirable to carry out the separation with solvent loading in the range of about 5 to about 15% hydrocarbon. In the separation of isoprene-isopentene mixtures by solvent extraction at atmospheric temperatures using aqueous lactone as solvent, optimum loadings will result at water concentrations in the aqueous lactone between about 15 and about 40% by volume, and more preferably between about 20 and about 30% by volume. Greater concentration of water can be used, however, increasing the quantity of water above the amounts given does not usually provide an improvement in separation efficiency proportionate to the decrease in feed throughput which results.

Figure 2:
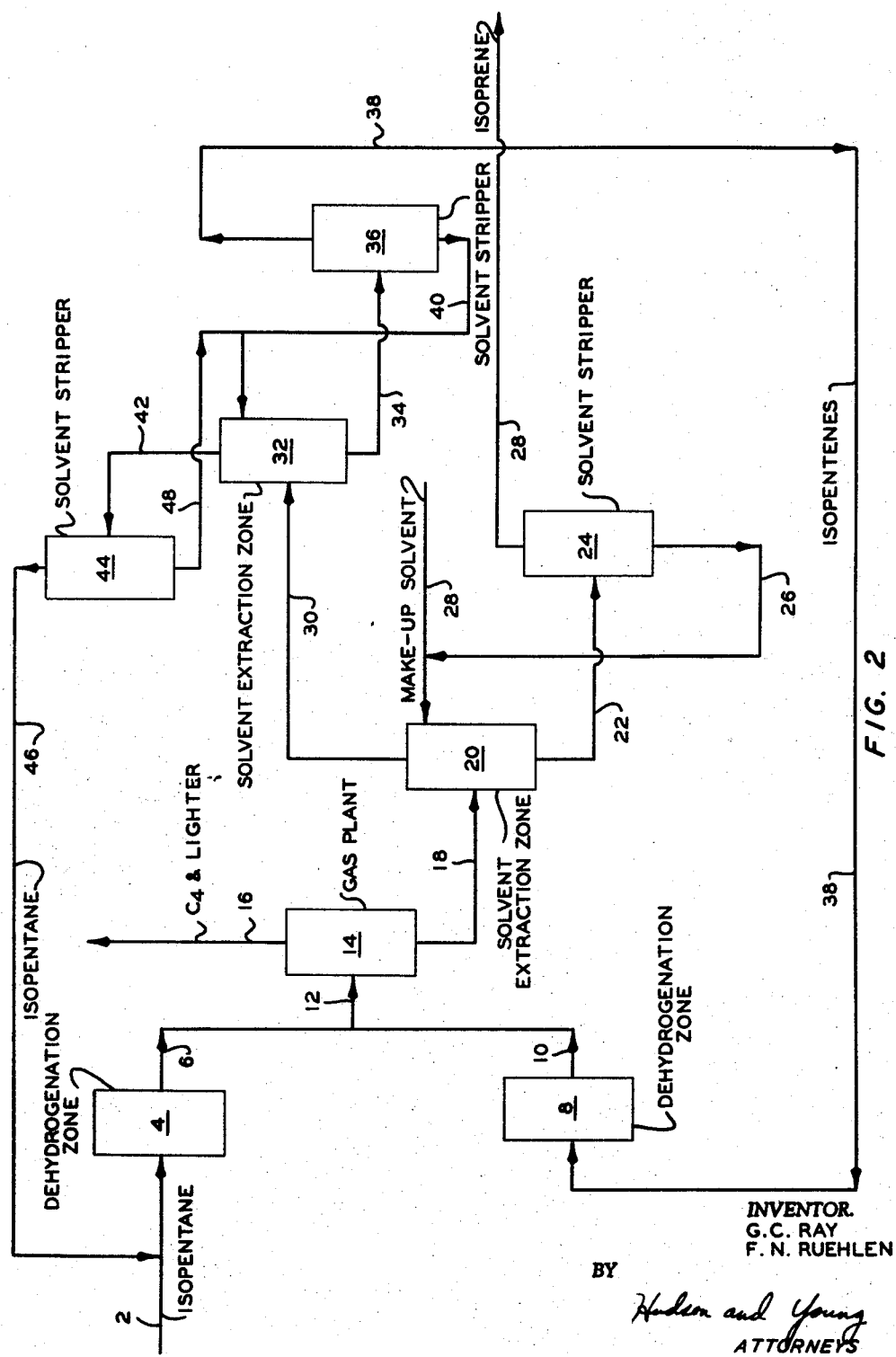

In order to more clearly describe the invention and provide a better understanding thereof reference is had to the accompanying drawing, Figure 2, which is a diagrammatic illustration of an isopentane dehydrogenation unit, including apparatus for the recovery of isoprene by solvent extraction.

Referring to Figure 2, fresh isopentane feed which can contain minor quantities of normal pentane, is introduced to dehydrogenation zone 4 through conduit 2. Before entering zone 4 the fresh feed is joined by recycle isopentane through conduit 46. In zone 4 the isopentane contacts a chromia-alumina dehydrogenation catalyst at a temperature of about 1100° F. whereby a portion of the feed material is converted to isoprene, various olefins, and lower boiling hydrocarbons. The product of the reaction is withdrawn from the dehydrogenation zone through conduit 6, joined by effluent from dehydrogenation zone 8 through conduit 10, and the combined effluent is introduced through conduit 12 to gas plant 14. In the gas plant the effluent is fractionated to effect the removal of $C_4$ and lower boiling hydrocarbons and noncondensibles, these materials being withdrawn from the gas plant through conduit 16. The remainder of the reaction effluent, comprising a mixture of isoprene, unconverted isopentane, 3-methylbutene-1, 2-methylbutene-1, and 2-methylbutene-2 is passed through conduit 18 into solvent extraction zone 20. In this zone the effluent is contacted with aqueous gamma-butyrolactone introduced thereto through conduit 26. The lactone, which is a selective solvent for isoprene, removes this material from the hydrocarbon mixture, and a mixture of isoprene and solvent passes from the bottom of the solvent extraction zone through conduit 22 and into solvent stripper 24. In the stripper heat is applied to the mixture whereby isoprene is vaporized and removed overhead through conduit 28. The stripper bottoms comprising essentially solvent are returned to the solvent extraction zone through conduit 26, as previously set forth. As necessary makeup solvent can be introduced to the solvent extraction zone through conduit 28. The overhead from zone 20, comprising unreacted isopentane and isopentenes, is removed through conduit 30 and introduced to a second extraction zone 32. The solvent employed in this extraction can also be gamma-butyrolactone, or if desired, another solvent suitable for separating olefins from paraffins can be employed. If a different solvent is used in zone 32 the overhead from zone 20 should be stripped (not shown) to remove gamma-butyrolactone. The solvent is introduced to the extraction zone through conduit 40 and passes countercurrently to the mixed isoparaffin-isoolefin stream. The olefins are preferentially absorbed from the mixture and are removed from the extraction zone through conduit 34, and introduced to solvent stripper 36. In the stripper the isopentenes are separated from the solvent being removed through conduit 38 and introduced to dehydrogenation zone 8. In this zone the isopentenes are converted to isoprene in the presence of a suitable dehydrogenation catalyst, such as a composite of potassium carbonate, iron oxide and chromium oxide. The reaction is carried out in the temperature range of 1100 to 1250° F. and in the presence of steam. The solvent recovered from stripper 36 is recycled to the solvent extraction zone through conduit 40. The overhead from zone 32 which comprises principally isopentane with some solvent, is passed through conduit 42 to a solvent stripper 44 wherein separation between the solvent and isoparaffin is effected. The solvent is recycled to extraction zone 32 through conduit 48 and the isopentane is introduced to dehydrogenation zone 4 through conduit 46. Although not set forth specifically it is understood that the process flow includes conventional pumps, exchangers and instrumentation, as necessary to carry out the operation.

While the preceding discussion has been directed to a preferred embodiment of the invention this is not intended in any limiting sense and is within the scope of the invention to employ other process and apparatus arrangements for carrying out the invention. Thus, for example, the separation and recovery for recycle of isopentenes and isopentane can be effected by suitable processing operations other than solvent extraction.

The following data is presented in illustration of one embodiment of the invention.

*Example I*

Solubility data at 75° F. for 100% isoprene and 100% 2-methyl-2-butene were obtained by separately dissolving these compounds in gamma-butyrolactone containing various concentrations of water. The resulting data are presented in the form of curves in Figure 1. In addition solubility measurements at 75° F. were obtained on hydrocarbon mixtures containing 100% isoprene, 91% isoprene and 83.2% isoprene by titrating the solutions of hydrocarbon in the lactone with water until phase separation occurred. These measurements were made at 31.0–31.4 and 31.8 volume percent hydrocarbon, respectively. The dash lines represent solubility curves estimated for the two percentages of isoprene, 91% and 83.2%. Referring to the figure, the 100% isoprene curve represents the maximum amount of pure isoprene which can be dissolved in aqueous gamma-butyrolactone, the specific value of isoprene which is soluble being dependent on the volume percent of water in the lactone solvent. Correspondingly, the 91% isoprene curve represents the approximate maximum quantity of a mixture of 91% isoprene and 9% 2-methyl-2-butene which can be dissolved in the lactone solvent. It is apparent from the curves that an important factor in the solubility of the hydrocarbon or hydrocarbons is the volume percent water in the solvent. For example, assume a mixture of hydrocarbon and dry solvent in which the volume percent of hydrocarbon is 31. In this system, according to figure, the isoprene and solvent are 100% miscible. If water is added to the system, the mixture remains miscible, that is, one phase, until the volume percent water based on the solvent increases to about 10%. At this point a separation into two phases occurs, and as the water content is further increased, additional hydrocarbon is rejected from the solvent. Thus, if it is desired to recover 100% isoprene from a mixture of hydrocarbon and solvent containing 31 volume percent hydrocarbon, the separation is not possible until the water content of the solvent reaches about 10 volume percent. If an isoprene product of lesser purity is satisfactory a solvent containing less water can be employed. Thus, recovery of a product containing 91% by volume of isoprene from the same mixture can be effected with a solvent containing less than 9% water.

The water requirements which can be predicted from Figure 1 are minimum values and while theoretically possible of achievement would probably require an excessive number of trays. However, as the water content of the solvent is increased above the minimum predicted from the curves the degree of separation is substantially increased and the number of trays reduced to a practicable number. Although it is possible to operate in the region of the figure where the volume percent hydrocarbon is high, from the viewpoint of selectivity, operation with low solvent loadings, namely, in the region of from 5 to 15 volume percent hydrocarbon, is preferred.

*Example II*

A run was carried out in which a mixture of equal volumes of isoprene and 2-methyl-2-butene was extracted with gamma-butyrolactone containing 30.2% water by volume. The quantities of solvent and hydrocarbon were adjusted to provide an aqueous solvent to hydrocarbon ratio of 2:1. The test, which was carried out at 75° F., provided a solvent loading of 2.6 weight percent and a separation factor of isoprene with respect to 2-methyl-2-butene of 1.94. The separation factor is equal to the equilibrium constant of isoprene divided by the equilibrium constant of 2-methyl-2-butene. For a difficult separation of this type 1.94 is a very good separation factor.

Having thus described the invention by providing specific examples thereof it is to be understood that no undue limitations or restrictions are to be drawn by reason thereof and that many variations and modifications are within the scope of the invention.

We claim:
1. In the separation of diolefins from a mixture containing diolefins and olefins the step of solvent extracting said mixture with an aqueous solution of a lactone of an aliphatic acid having from 4 to 12 carbon atoms per molecule, said solution containing from 5% to 40% by volume of water.
2. The process of claim 1 in which the aqueous lactone solution contains between about 15 and about 40% by volume of water.
3. In the separation of a diolefin from a mixture containing a diolefin selected from the group consisting of butadiene and isoprene and an olefin having a corresponding number of carbon atoms per molecule, the step of solvent extracting said mixture with an aqueous solution of a lactone of an aliphatic acid containing from 4 to 12 carbon atoms per molecule, said solution containing from 5% to 40% by volume of water.
4. The process of claim 3 in which the aqueous lactone solution contains between about 15 and about 40% by weight of water.
5. The process of claim 4 in which the lactone is gamma-butyrolactone.
6. The process of claim 4 in which the lactone is gamma-valerolactone.
7. In the separation of isoprene from a mixture containing isoprene and $C_5$ olefins, the step of solvent extracting said mixture with an aqueous solution of gamma-butyrolactone containing from 5% to 40% by volume of water.
8. The process of claim 7 in which the aqueous lactone solution contains between about 20 and about 30% by volume of water.
9. The process of claim 1 in which the extraction is carried out at a temperature between about 75° F. and about 150° F.
10. The process of claim 5 in which the extraction is carried out at a temperature between about 75° F. and about 150° F.
11. The process of claim 8 in which the extraction is carried out at a temperature between about 75° F. and about 150° F.
12. A process for the recovery of isoprene from a mixture containing isoprene and 2-methyl-2-butene, which process comprises subjecting said mixture to liquid-liquid extraction, at a temperature in the range 75 to 150° F., with a solvent consisting essentially of gamma butyrolactone and water, the water content of said solvent being in the range 15 to 40 volume percent, and forming a liquid phase of said solvent enriched with respect to isoprene and a hydrocarbon phase enriched with respect to 2-methyl-2-butene.

References Cited in the file of this patent

UNITED STATES PATENTS

| | | |
|---|---|---|
| 2,063,680 | Isham | Dec. 8, 1936 |
| 2,383,057 | Gross et al. | Aug. 21, 1945 |
| 2,831,905 | Nelson | Apr. 22, 1958 |

FOREIGN PATENTS

| | | |
|---|---|---|
| 548,734 | Great Britain | Oct. 22, 1942 |